US005422543A

United States Patent [19]
Weinberg

[11] Patent Number: 5,422,543
[45] Date of Patent: Jun. 6, 1995

[54] FLASH MONITOR ALARM SYSTEM

[76] Inventor: Stanley Weinberg, 575 Tigertail Rd., Los Angeles, Calif. 90049

[21] Appl. No.: 127,961

[22] Filed: Sep. 27, 1993

[51] Int. Cl.[6] ............................................. H01J 1/60
[52] U.S. Cl. ..................... 315/129; 315/135; 315/136; 315/200 A; 315/241 P
[58] Field of Search ............ 315/129, 135, 136, 241 P, 315/241 R, 200 A; 340/525.5; 455/99; 354/410, 131, 132

[56] References Cited

U.S. PATENT DOCUMENTS

| Re. 28,100 | 8/1974 | Long | 340/34 |
|---|---|---|---|
| 3,626,401 | 12/1971 | Flieder et al. | 340/253 |
| 3,662,168 | 5/1972 | Pelino et al. | 315/129 X |
| 4,234,967 | 11/1980 | Henschel | 455/603 |
| 4,701,672 | 10/1987 | Sikora | 315/241 S |

Primary Examiner—Robert J. Pascal
Assistant Examiner—Reginald A. Ratliff
Attorney, Agent, or Firm—Price, Gess & Ubell

[57] ABSTRACT

A flash monitor alarm system is provided for detection of emergency vehicle flashers or for detection of flashes in photography. For emergency flasher detection the unit is positioned in a vehicle within a direct line of sight of potential emergency flashers. When emergency flashers are detected, an alarm is activated to warn the vehicle's occupants. For a photographic monitor alarm system, a detector is inductively coupled to a flash tube assembly's flash tube or tube power cable for activating a pulsating flash monitor indicator perceptible to the photographer when the flash tube has properly fired. The flash monitor alarm system includes flash monitor electronics and a power source, both of which are built into a compact housing.

41 Claims, 6 Drawing Sheets

FLASH MONITOR ALARM SYSTEM

BACKGROUND OF THE INVENTION

1. Field of the Invention

The present invention relates to a flash monitor for determining the excitation of a flash tube in photography or the presence of flashing light such as that produced by an emergency vehicle and, more particularly, to a flash monitor alarm system for determining whether the inductive pulse associated with a photographic flash tube includes a true inductive flash tube discharge pulse, or whether the flash tube failed to fire properly or at all, and to a flash monitor alarm system that can detect emergency vehicle flashes even in the presence of strong ambient light.

2. Description of Related Art

The possibility of undetected flash failure in photography is increased as lighting setups become more complex or spread over larger studio set and location setups. In a tight, high-pressure shoot it is easy to miss a dead light.

The photographic flash monitor art is generally cognizant of flash monitors which utilize photosensors to detect light. While a "flash ready" light gives some assurance that the strobe fired, the assurance is not all it suggests. A ready light merely indicates that the capacitors have charged, which can happen even if the tube itself is defective. Although a few flash monitors exist, the art is still seeking an inexpensive, convenient, easily-mounted flash monitor alarm system capable of reliably distinguishing between a true inductive flash tube discharge pulse which is associated with the proper firing of a flash tube and a high-voltage trigger pulse not followed by a discharge pulse, such a trigger pulse being associated with a flash tube misfire.

On the other hand, emergency vehicle flashing lights are best detected by photodetectors. The prior art has employed photodetector systems that are able to detect flash patterns that are produced by special optical transmitters to cause traffic signals to respond to emergency vehicles. For example, see U.S. Pat. No. Re. 28,100 to Long and U.S. Pat. No. 4,234,967 to Henschel. While the prior art recognized the importance of a relatively complex transmitter/detector systems for use in traffic signal control, there remains a substantial need for a simpler system to warn drivers of individual cars or trucks that an emergency vehicle is operating in the vicinity. Modern vehicles have been made almost soundproof. Furthermore, vehicle sound systems including CD players, stereos, and cellular telephones interfere with a driver's ability to hear emergency vehicle sirens. During the daylight hours emergency vehicle flashers may not be easily perceived.

OBJECTS AND SUMMARY OF THE INVENTION

An object of the present invention is to provide a flash monitor alarm system that alerts the photographer in the event that a flash tube fails to fire properly.

Another object is to provide a flash monitor which alerts the photographer even when the flash tube failure is due to the photographer's failure to turn the flash tube on.

An additional object of this invention is to provide a flash monitor that can be mounted inside a vehicle and can readily detect the flashing lights of an emergency vehicle operating in the area and warn the vehicle's occupants of the same.

An additional object of the present invention is to provide a flash monitor alarm system that is inexpensively assembled and conveniently and easily mounted near a flash tube or a flash tube power cable or, in the case of an emergency vehicle alarm, on the dashboard or clipped to the visor or some other convenient position within a vehicle.

Still another object is to provide a flash monitor alarm system which distinguishes between a true inductive flash tube discharge pulse which occurs only when the flash tube properly fires and a high-voltage trigger pulse, not followed by a discharge pulse, which occurs when the flash tube misfires.

Still another object is to provide a flash monitor alarm system to detect emergency vehicles which distinguishes the short rise time optical pulses of flashing halogen or electronic gas discharge flashers on emergency vehicles from other flashing lights even in the presence of high ambient light levels.

The photographic flash monitor has a monitoring circuit that detects a change in the electromagnetic field surrounding the flash head. When the flash fires, a strong electromagnetic field is generated in its immediate proximity. The self-contained flash monitor of the present invention can be mounted to detect the electromagnetic field and to activate a light-emitting diode for a predetermined time period. The flash monitor does not respond to the light, per se; it monitors only the electromagnetic field directly surrounding the light head to which it is affixed. The monitoring circuit can use an electromagnetic inductive sensor or a Hall-effect sensor.

The emergency vehicle flash detector embodiment of the present invention has a photodetector circuit that detects the flashing light from an emergency vehicle. This photosensor is mounted in a vehicle in such a position as to omnidirectionally detect any high rate of rise flashing lights within a large area. The detector circuit is designed to differentiate the short rise time signals of emergency flashers from other flashing light sources.

The flash monitor assembly includes an indicator, a mounting mechanism, a detector, a verification circuit, an activation circuit, and a power source. The photographic flash monitor is positioned by the mounting mechanism adjacent the flash tube and its power line such that the flash monitor detector is responsive to the excitation of a flash tube. The detector provides a detection signal indicative of whether or not the flash tube properly fired. The verification circuit receives the detection signal and verifies a detection of a true inductive flash tube discharge pulse when the flash tube properly fires. When such a verified detection has been sensed, the activation circuit enables the indicator for a predetermined time period.

The emergency vehicle flash detector is most conveniently mounted on the dashboard or clipped to the visor of a vehicle. The detector circuit provides detection of an optical signal indicative of an operating emergency vehicle. When the verification circuit verifies the detection of a true emergency vehicle flasher signal, the activation circuit enables the indicator for a predetermined time period. The indicator comprises visual and audible alarms including a radio frequency pulser that produces an alarm tone over the vehicle's radio.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a flash monitor alarm system.

Figure 1:
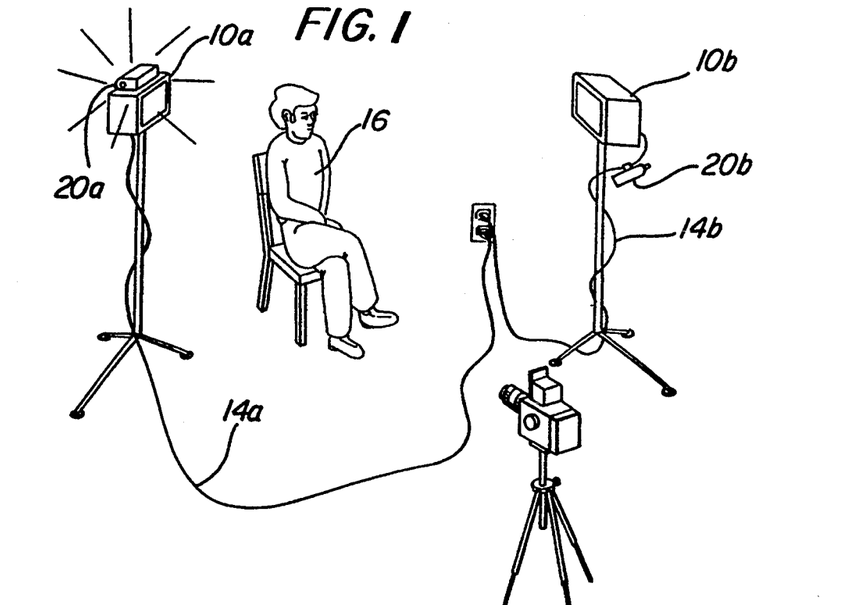
FIG. 1 is an illustration of a first flash monitor (A) mounted on an external surface of a flash tube assembly and of a second flash monitor (B) mounted near a flash tube power cable as flash monitors are typically used in photography.

FIG. 1 exemplifies a typical photographic environment where several flash tube assemblies, 10a, 10b, are arranged to optimally illuminate a subject 16. If either one of the flash tube assemblies fails to properly fire, or is not turned on, the resulting photographs, and perhaps the entire photography session, will suffer in quality. Traditionally, photographers have used one or several photosensors to determine that which the human eye is incapable of verifying, namely, whether or not all of the flash tube assemblies properly fired while the photograph was being taken. Such an approach has problems in that it depends upon detection of light emitted from flash tube assemblies which, when broken, burned out, or otherwise malfunctioning, may emit light inadequate for photographic purposes, yet sufficiently intense to deceive a photosensor into erroneously detecting a suitable flash. Since electronic xenon gas discharge can occur within 1000th of a second or less, the human eye in blinking can often miss seeing the light burst of an individual unit or be blinded by the functioning units and miss seeing that a unit has malfunctioned.

Flash monitors 20a and 20b provide one solution which is dependent upon a particular inductive coupling rather than upon light detection. Mutual inductance between two circuits results in the induction of an electromotive force in one circuit by a change of current in the other. The respective current changes within flash tube assemblies 10a and 10b, as well as through their respective flash tube power cables 14a and 14b, over the period of time during which a proper flash occurs, are respectively measured by flash monitors 20a and 20b. Such current changes are indicative of whether each flash tube assembly properly fired (inductive energy characteristic of a true inductive discharge pulse emitted), misfired (inductive energy characteristic of a high-voltage trigger pulse not followed by a discharge pulse emitted), or was not turned on (no inductive energy emitted).

Figure 2:
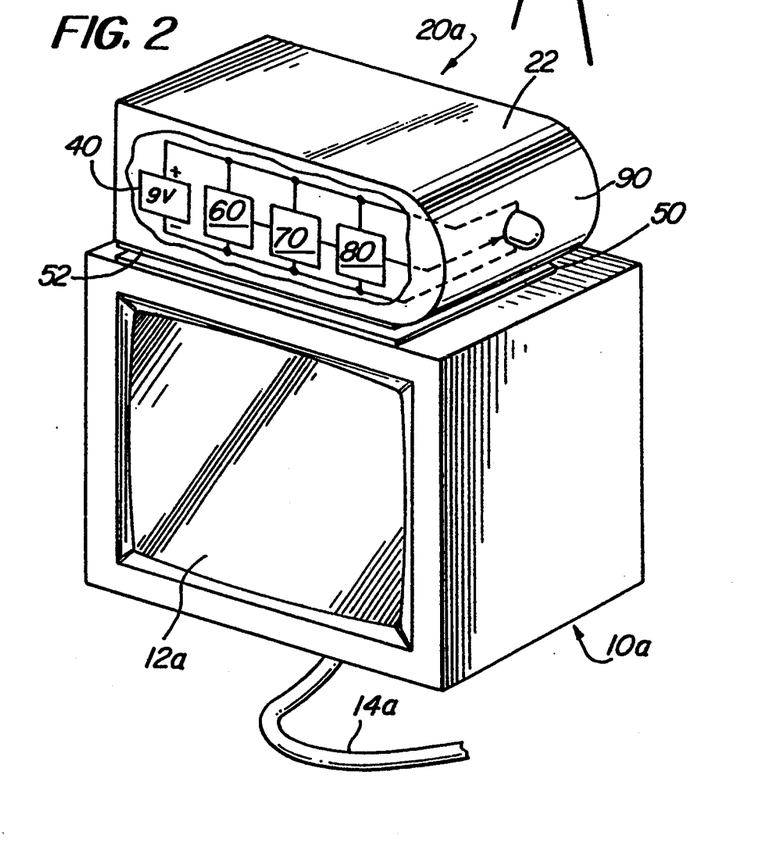
FIG. 2 is a schematic perspective of a flash monitor which is mounted on an external surface of a flash tube assembly with a mounting strip.

FIG. 2 depicts a flash tube assembly 10a and a flash monitor alarm system 20a attached thereto via mounting strip 50 and securing strip 52. Flash monitor 20a senses an inductive pulse from flash tube assembly 10a by virtue of its proximity to flash tube 12a. Mounting strip 50 is attached to flash monitor 20a and includes an adhesive strip for securement to a housing of the monitor 20a. A securing strip 52 likewise includes an adhesive strip for attaching a securing strip 52 to the exterior surface 53 of flash tube assembly 10a. Preferably, both mounting strip 50 and securing strip 52 are made of or covered on their nonadhesive sides with a securing material (such as Velcro TM) which facilitates quick attachment of flash monitor 20a to flash tube assembly 10a.

Figures 3, 5:
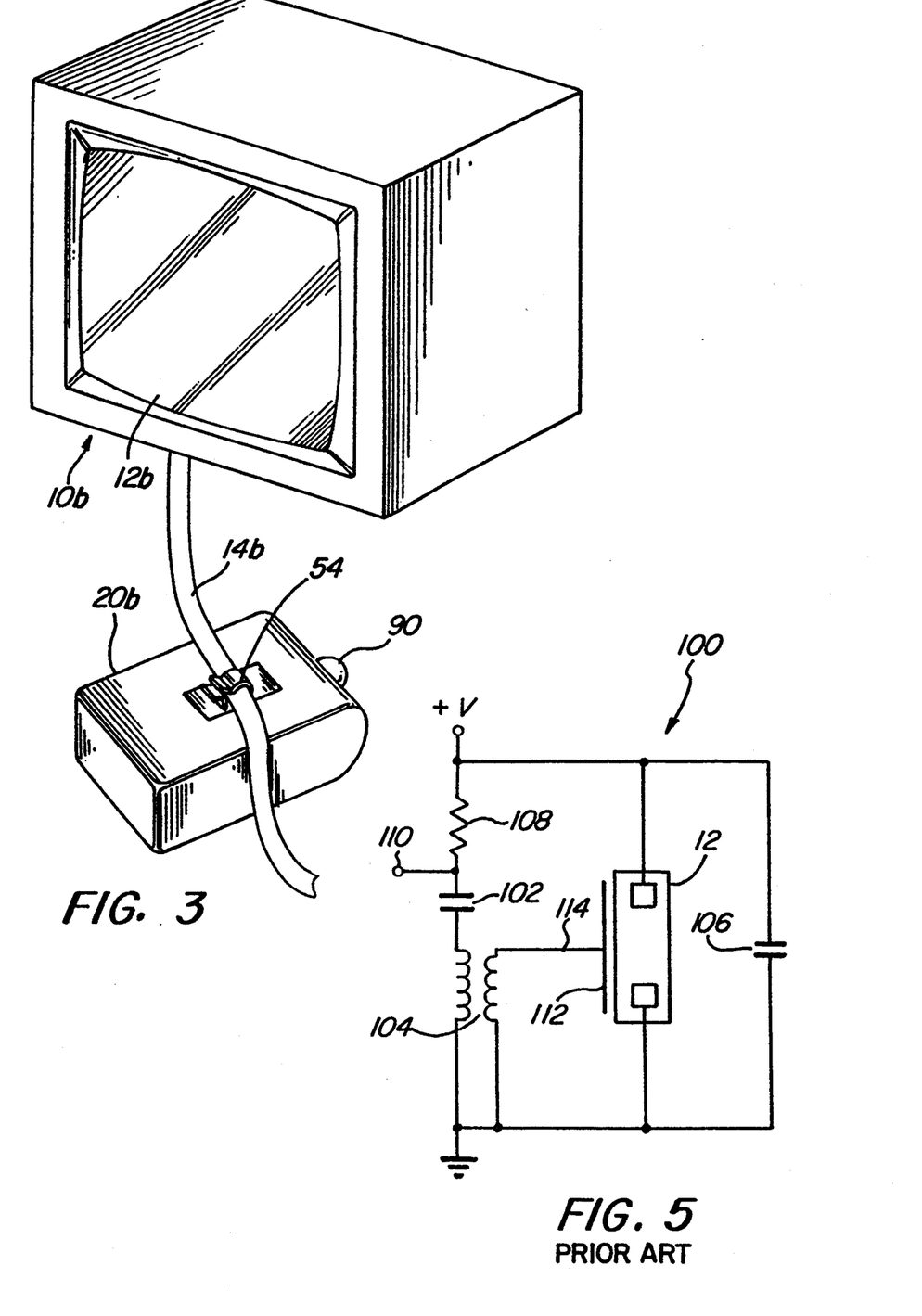
FIG. 3 is a schematic perspective of a flash monitor which is mounted near a flash tube power cable with a mounting strap.
FIG. 5 is an electronic schematic of a flash tube assembly.

Similarly, FIG. 3 shows a flash tube assembly 10b and a flash monitor alarm system 20b attached to its flash tube power cable 14b via mounting strap 54. Flash monitor 20b senses an inductive pulse from flash tube 12b in flash tube assembly 10b by virtue of its proximity to a flash tube power cable 14b. Mounting strap 54 is attached to flash monitor 20b by an adhesive strip. Preferably, mounting strap 54 is adjustable to fit any flash tube power cables 14 varying in diameter. Flash monitor alarm system 20b can be attached anywhere along the length of a flash tube power cable 14b from the wall socket to the exterior surface 53 through which the flash tube power cable 14b enters into the flash monitor alarm system 20b. A quick-release nylon clip (not shown) can be used for attaching the system 20b to the cable or cord between a power pack and a strobe head. This is helpful in situations where the strobe head is hidden by an umbrella or soft box.

The invention will also detect surge currents charging to huge multiplier circuits directly by clipping to power cords. Most modern electronic flash power packs utilize these diode capacitor direct charging circuits, and so can be monitored by the invention directly by sensing the electromagnetic charging field.

Figure 4:
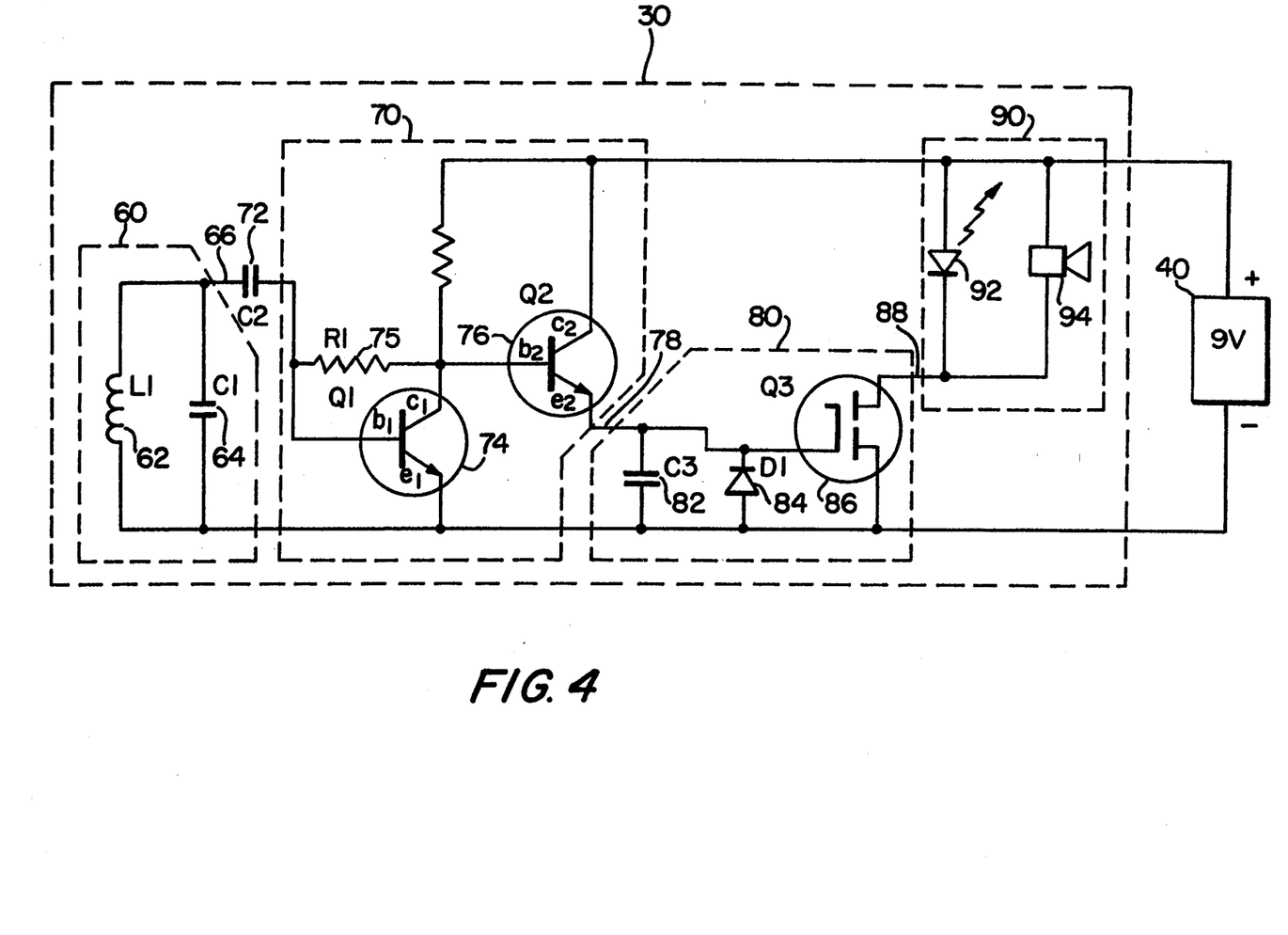
FIG. 4 is an electronic circuit schematic of the flash monitor electronics.

As seen in FIG. 2, and more elaborately in FIG. 4, flash monitor 20 includes flash monitor electronics 30 and power source 40, all of which are contained within housing member 22. Preferably and as shown, power source 40 is entirely contained within flash monitor 20, thereby eliminating the need to encumber flash monitor 20 with extraneous power cables which would make the flash monitor 20 less portable and less easily attached to exterior surface 53 or flash tube power cable 14.

In addition to the ease with which flash monitor 20 is secured to flash tube assembly 10, flash monitor 20 is inexpensively assembled from relatively few parts. FIG. 4 shows a schematic of the flash monitor electronics 30 which includes a detector 60, a verification circuit 70, an activation circuit 80, and an operator indicator or alarm 90. As a prerequisite to a discussion of the operational details of flash monitor 20, it is important to understand how flash tube assembly 10 functions.

FIG. 5 shows flash trigger circuit 100, which is a part of flash tube assembly 10 and includes a flash tube 12. Trigger circuit 100 additionally includes a trigger capacitor 102, a trigger coil 104, a capacitor bank 106, and a resistor 108. When a sync signal input 110 transitions from an open state to ground, the charge stored in the trigger capacitor 102 rapidly discharges, creating a voltage spike across the primary windings of the trigger coil 104. A high-voltage spike (approximately 10 kilovolts) is generated across the secondary of the trigger coil 104 and then provided to an ionization plate 112 of the flash tube 12 as a high-voltage trigger signal 114. The flash tube 12 then fires as the charge stored in the capacitor bank 106 rapidly dissipates through the ionized path created in the flash tube 12 by the high-voltage trigger signal 114.

A particularly useful and distinguishing feature of flash monitor 20 is that it generates an alarm effect when flash tube 12 has properly fired. The flash monitor electronics 30 serve to distinguish between a true inductive flash tube discharge pulse (flash tube 12 properly fired) and either a high-voltage trigger pulse without the discharge pulse (flash tube 12 misfired) and a condition where flash tube assembly 10 was not provided with power (flash tube 12 not even triggered). In other words, flash monitor 20 only generates an alarm effect when flash tube 12 properly fires. A more detailed discussion of detector 60, verification circuit 70, activation circuit 80, and indicator 90 follows.

Detector 60, as seen in FIG. 4, is responsive to the excitation of flash tube 12 and is comprised of inductor (L1) 62 and detector capacitor (C1) 64. The respective values of inductor 62 and detector capacitor 64 are selected in consideration of the flash environment typical in photography. More specifically, L1 and C1 are chosen to discriminate between a true inductive flash tube discharge pulse and the high-voltage trigger pulse preceding the former. Detector 60, by virtue of its proximity to flash tube 12 or flash tube power cable 14, is inductively coupled to flash tube 12. Detector capacitor 64 is selected so that the inductive energy received by detector 60 is output as a detection signal 66. The magnitude of detection signal 66 depends upon whether the inductive energy received by detector 60 is the inductive energy associated with a discharge pulse or a trigger pulse. Inductor 62 and detector capacitor 64 are connected in parallel and, accordingly, integrate the received inductive energy. Without C1, L1, detector 60 would only detect a high-amplitude trigger signal. Detector capacitor 64 prevents a detection signal 66 indicative of a discharge pulse when detector 60 is exposed to a narrow pulsewidth, very high magnitude trigger flash pulse (approximately 10 kilovolts for a few microseconds); the flash tube light pulse duration for a discharge pulse being in the order of milliseconds in contrast.

In summary, detector 60 is responsive to the inductive energy characteristic of flash tube operation, integrates the received inductive pulse, and outputs a detection signal indicative of whether or not flash tube 12 properly fired. A trigger pulse which does not contain enough inductive energy to integrate into a detection signal 66 indicative of a true discharge pulse, often occurs even though flash tube 12 may be damaged, broken, burned out, or weak. The combination of L1 and C1 is responsive to inductive energy and converts the same into detection signal 66, which is provided to verification circuit 70.

Figure 6:
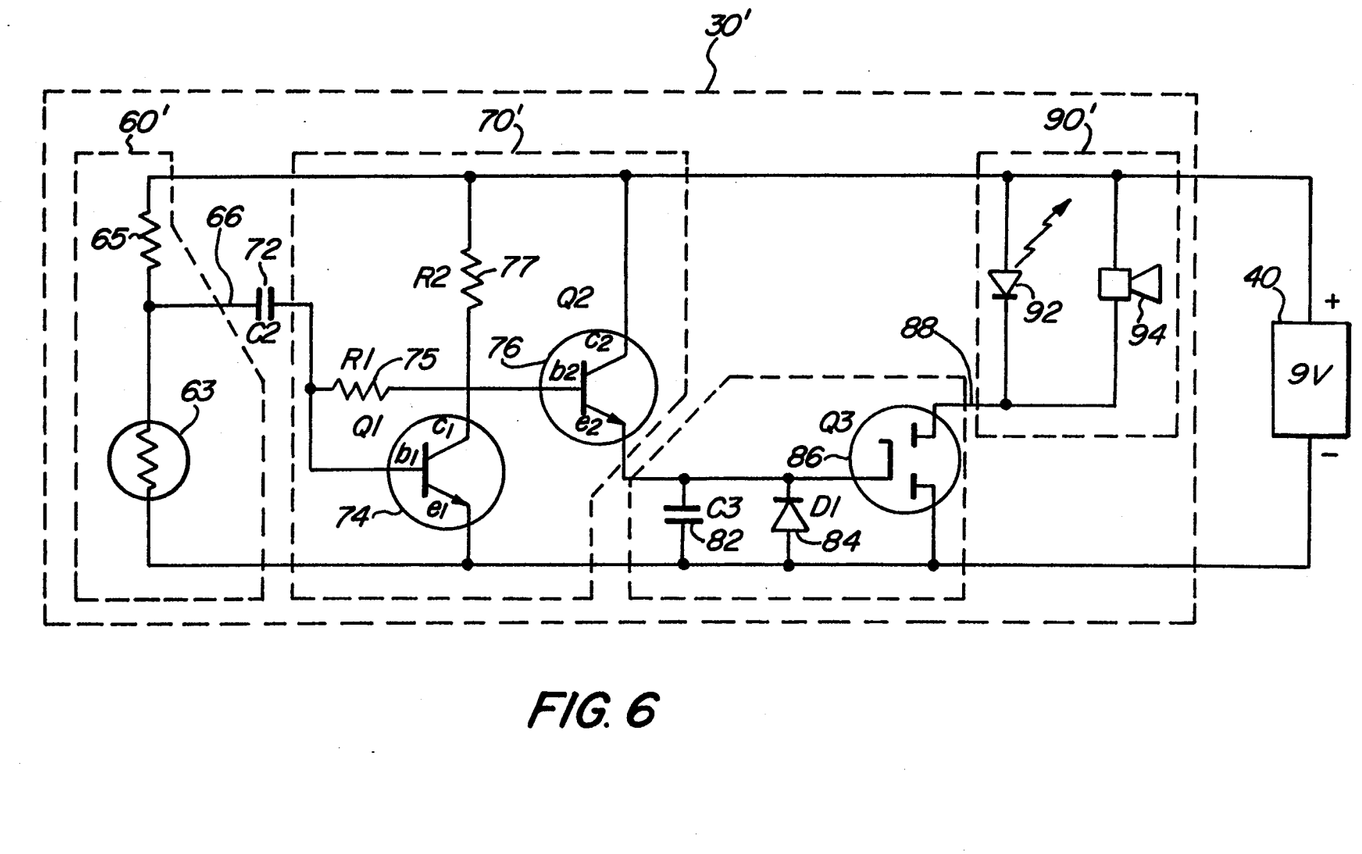
FIG. 6 is an alternative embodiment of a flash monitor electronic circuit.

FIG. 6 shows an alternative preferred embodiment of the flash monitor electronics 30' wherein detector 60 is replaced with detector 60' which includes a "Hall Effect" sensor. A "Hall Effect" or magnetostrictive sensor 63 detects the magnetic field produced by the large discharge current of the flash tube 12 and changes its resistance in response thereto. Magnetostrictive sensor 63 and resistor 65, which acts as a current transformer, can comprise detector 60'.

The voltage induced across the L1/C1 parallel combination of FIG. 4 is applied to verification circuit 70 through blocking capacitor (C2) 72. Verification circuit 70, which may also be described as a micropower amplifier, includes first transistor (Q1) 74, biasing resistor (R1) 75, second transistor (Q2) 76, and load resistor (R2) 77. First transistor 74 includes a first collector ($c_1$), a first base ($b_1$), and a first emitter ($e_1$). Likewise, second transistor 76 includes a second collector ($c_2$), a second base ($b_2$), and a second emitter ($e_2$). First resistor 75 electrically connects first collector ($c_1$) and first base ($b_1$) and is selected to bias Q1's base such that Q1 begins conducting when a lower magnitude voltage is applied across Q1's base and emitter. Accordingly, R1 is selected to increase Q1's sensitivity to detection signal 66.

Before an inductive pulse is received by detector 60 and sent to verification circuit 70 as detection signal 66, Q1 is conducting and Q2, which is electrically connected to Q1's collector ($c_1$) by its base ($b_2$), is partially conducting as an emitter follower. Following the negative transition of a detection signal 66 indicative of a true discharge pulse, rather than a mere trigger pulse, Q1 stops conducting, necessarily resulting in Q2's base being pulled up to the voltage on Q2's collector. Micropower amplifier 70 essentially acts as a switch which is responsive to whether or not flash tube 12 fired to specification. The receipt, by verification circuit 70, of a detection signal 66 indicative of a true discharge pulse, triggers the application of a verification voltage 78 to activation circuit 80 through the emitter-follower Q2. Additionally, a desire to minimize the amount of current consumed by verification circuit 70 is a primary consideration in the selection of R2, which is electrically connected across Q2's base and collector.

Activation circuit 80 includes charging capacitor (C3) 82, discharge diode (D1) 84, and enhancement-mode MOSFET (Q3) 86. Discharge diode 84 and charging capacitor 82 are electrically connected in parallel and receive verification voltage 78 from verification circuit 70. Once the magnitude of verification voltage 78 is sufficiently large to charge C3 to a charging capacitor voltage beyond the threshold conduction level of Q3, an activation voltage 88 is applied to indicator 90 by MOSFET 86. Discharge diode 84 is selected such that it will act much like a large resistor slowly discharging C3, and thereby limit the conduction time of Q3 to approximately five seconds, after which the flash monitor electronics 30 reset.

Indicator 90 may consist of one or several devices capable of producing an alarm effect detectable by the photographer. For example, indicator 90 may include a light-emitting diode (LED) 92, as well as a loudspeaker 94. In a preferred embodiment, LED 92 and loudspeaker 94 are a large flashing (or pulsating) red LED emitting visible light and a piezoalarm generating an audible sound, respectively.

Preferably, all of the aforementioned componentry within the flash monitor electronics 30 and power source 40 are packaged together within housing member 22. Flash monitor 20 can operate on a power source 40 such as a nine-volt battery for extended periods of time because verification circuit 70 consumes very little current (less than approximately 4 μA). As the flash monitor electronics 30 and power source 40 are easily built into a compact assembly, flash monitor 20 is more readily positioned close to flash tube 12 or flash tube power cable 14, thereby optimizing inductive coupling.

Figure 7:
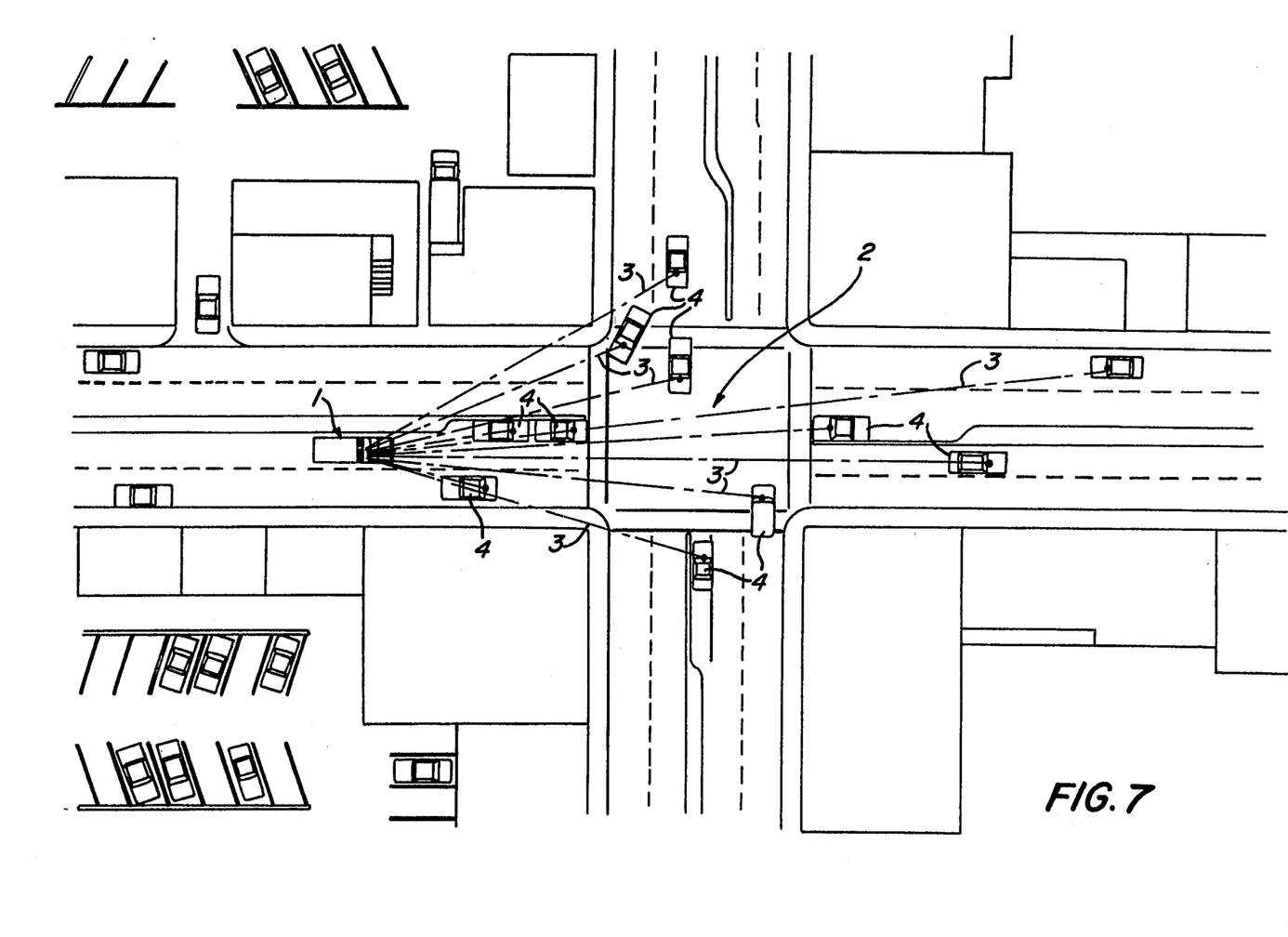
FIG. 7 is a diagram of a flash monitor alarm being used to detect the presence of an emergency vehicle.

FIG. 7 is a diagram of the flash monitor alarm in use to warn motorists of an approaching emergency vehicle. Emergency vehicle 1 is speeding down a street towards intersection 2 with its emergency flasher emitting pulses of light 3. These pulses of light 3 travel in a straight line from the emergency vehicle 1 and strike other vehicles 4. These vehicles have a flash monitor alarm mounted on their dashboard or window visor or some other location that can receive the pulses of light 3. The flash monitor alarm detects these pulses and sets off an audible and visible alarm to warn the motorist of the approaching emergency vehicle so that the motorist can pull over to the side of the road and get out of the intersection 2.

Figure 8:
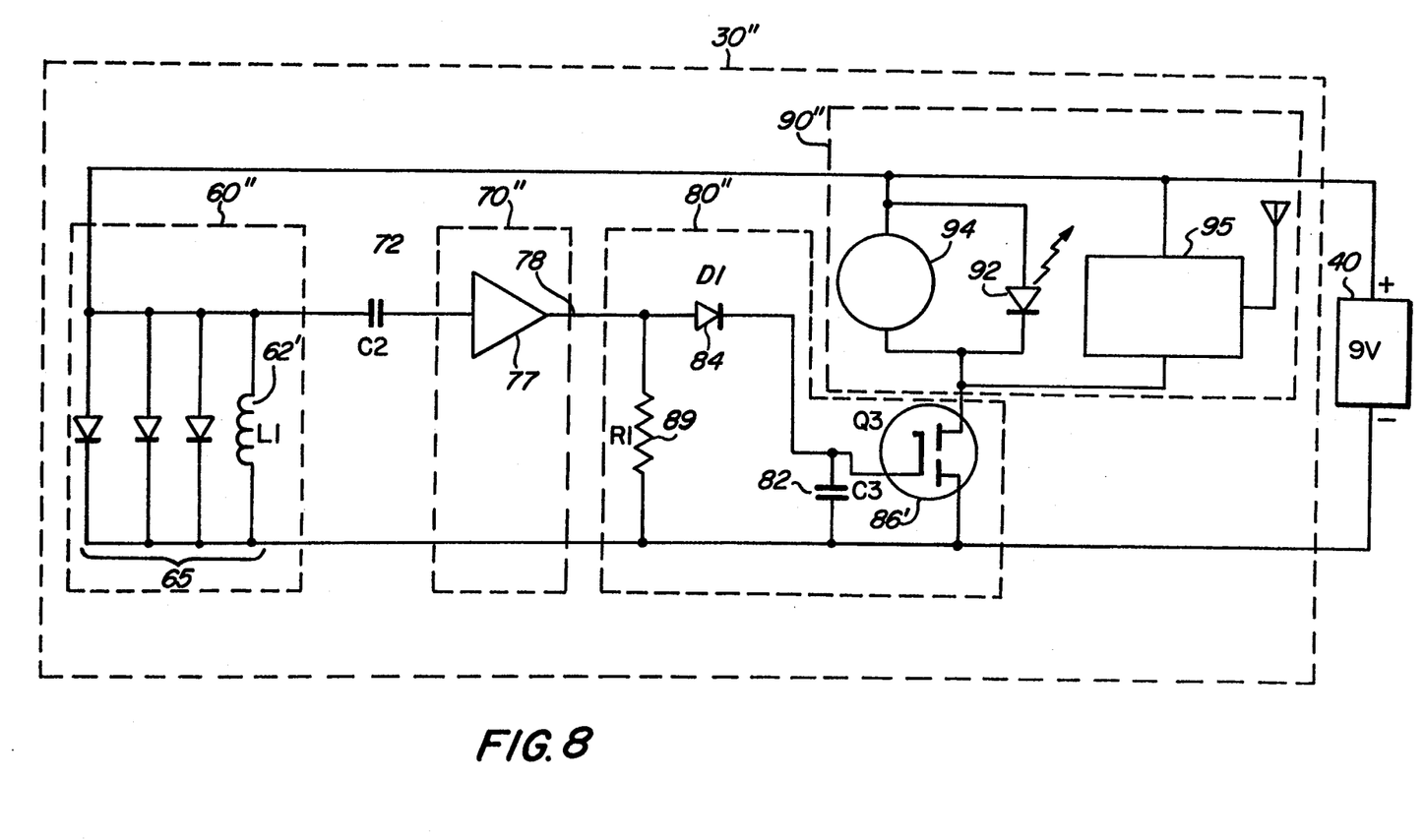
FIG. 8 is an embodiment of a flash monitor electronic circuit particularly suited to detection of emergency vehicle flashers.

FIG. 8 shows the schematic diagram of a preferred embodiment of the flash monitor constructed to detect the short rise time pulses of light from an emergency vehicle flasher. Line of sight in all directions can exceed 3000 feet even in bright sunlight. The optical pulses also bounce off of buildings, further extending the range. The circuit differentiates between slow-changing light levels and pulses from emergency flashers due to the extreme rapid rate of rise of the light pulses from emergency flashers of the gas discharge type or the rapidly-revolving halogen flasher type.

The detector 60" comprises a photo pin diode array 65 connected in parallel with ferrite toroid (L1) 62'. A preferred photodiode is an octal parallel array such as Seimens SFH205. An alternate embodiment comprises multiple diode arrays arranged radially and separated by baffles. Such an arrangement is directional and allows the construction of a flash alarm that indicates the direction of the approaching emergency vehicle. The toroid 62' has a closed magnetic field and acts as a suppressor of the ambient light signal from the photodiode array. Any toroid over 300 milihenries inductance with a D.C. resistance under 100 ohms will respond only to fast rate of rise impulses from the photodiode array.

As in the earlier-explained embodiments, the detector 60" produces a signal that passes through a blocking capacitor 72 to a verification circuit 70". As before, the verification circuit acts as a switch that responds to an sufficient signal from the detector. This embodiment shows the use of a CMOS (complementary metal oxide semiconductor) gate 77. Operational amplifiers can also be used for this purpose.

Activation circuit 80" includes charging capacitor (C3) 83 and enhancement-mode MOSFET (Q3) 86. Once the magnitude of verification voltage 78 from verification circuit 70" is sufficiently large to charge C3 to a voltage beyond the threshold conduction level of Q3, an activation voltage 88 is applied to indicator 90" by MOSFET 86. Discharge diode 84 and resistor 89 discharge C3 and cause the alarm to reset after 15 seconds.

The combination of R1, D1, and C3 are chosen so that the double flash-strobe sequence typical of emergency vehicles allows C3 to charge to the threshold conduction of MOSFET 86, but not be falsely triggered by other flashing light sources. The diode drop produced by diode 84 ensures that the resting voltage output of the CMOS gate 77 is below the conduction threshold of MOSFET 86.

Indicator 90" may consist of one or several devices capable of producing an alarm effect detectable by the motorist. The indicator circuit 90" may include a light-emitting diode (LED) 92, as well as a piezoelectric loudspeaker 94 and a radiofrequency pulser 95. The radio-frequency pulser outputs bursts of radio waves that will be heard as loud tones over the vehicle's radio if the radio is operating.

All of the above-mentioned components, as well as a power supply 40, are preferably packaged together in housing member to be removably mounted on the vehicle dashboard or clipped to the visor. Alternately, the unit can be powered by a cord connected to the vehicle's electrical system.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A flash monitor alarm for determining the occurrence of a flash comprising:
   a housing member;
   an indicator attached to the housing member, the indicator being perceptible to an operator;
   means for removably mounting the housing member to be operatively responsive to occurrence of a flash;
   remote detection means having no electrically conductive connection to the flash for responding to the occurrence of the flash by providing a detection signal;
   means responsive to the detection signal for verifying that the detection means has sensed the occurrence of a flash; and
   means for activating the indicator for a predetermined time period when the flash occurrence has been verified by the verification means;
   wherein the detection means, verifying means, and activating means are contained within the housing member.

2. The flash monitor alarm of claim 1 further comprising a source of power contained within the housing member for powering the indicator, the verifying means, and the activating means.

3. The flash monitor alarm of claim 1 wherein the detection means is responsive to the inductive energy of a flash tube assembly used in photography.

4. The flash monitor alarm of claim 1 wherein the detection means is responsive to the short rise time optical energy of a flashing light source used on emergency vehicles.

5. A flash monitor for determining the excitation of a flash tube in photography comprising:
   a housing member;
   an indicator attached to the housing member, the indicator being perceptible to an operator;
   means for removably mounting the housing member to be operatively responsive to an excitation of a flash tube;

remote detection means, having no electrically conductive connection with the flash tube and responsive to the excitation of the flash tube, for providing a detection signal;

verification means responsive to the detection signal for verifying that the detection means has sensed the excitation of the flash tube; and means for activating the indicator for a predetermined time period when the flash tube excitation has been verified by the verification means;

wherein the remote detection means, verification means, and activating means are contained within the housing member.

6. The flash monitor of claim 5 further comprising a source of power contained within the housing member for powering the indicator, the verifying means, and the activating means.

7. A flash monitor for detecting an inductive energy of a flash tube assembly in photography, the inductive energy including a true inductive flash tube discharge pulse when the flash tube properly fires, the flash tube assembly including a flash tube, a tube power cable, and an exterior surface surrounding the flash tube and through which the tube power cable traverses, the flash monitor comprising:

a housing member;

an indicator attached to the housing member, the indicator being perceptible to an operator;

means for removably mounting the housing member to be operatively responsive to an inductive energy associated with an excitation of a flash tube;

remote detection means having no electrically conductive connection to the flash tube for providing a detection signal by responding to the inductive energy of the flash tube;

verifying means for receiving the detection signal and providing a verification signal when the detection signal indicates that the inductive energy detected by the detection means includes a true inductive flash tube discharge pulse; and activating means responsive to the verification signal for activating the indicator for a predetermined time period;

wherein the detection means, verifying means, and activating means are contained within the housing member.

8. The flash monitor of claim 7 wherein the mounting means secures the housing member to the exterior surface of the flash tube assembly, thereby positioning the detection means sufficiently near the flash tube for reliable detection of the inductive energy.

9. The flash monitor of claim 7 wherein the mounting means secures the housing member to the tube power cable of the flash tube assembly, thereby positioning the detection means sufficiently near the tube power cable for reliable detection of the inductive energy.

10. The flash monitor of claim 7 further comprising a source of power contained within the housing member for powering the indicator, the verifying means, and the activating means.

11. The flash monitor of claim 10 wherein the verification means consumes less than 4 microamperes from the source of power at any time during operation of the flash monitor.

12. The flash monitor of claim 7 wherein the predetermined time period is approximately five seconds.

13. The flash monitor of claim 7 wherein the indicator generates an audible sound when the flash tube properly fires.

14. The flash monitor of claim 7 wherein the indicator generates a visible light emission when the flash tube properly fires.

15. The flash monitor of claim 7 wherein the indicator comprises a loudspeaker generating an audible sound when the flash tube properly fires.

16. The flash monitor of claim 15 wherein the loudspeaker is a piezoelectric loudspeaker.

17. The flash monitor of claim 7 wherein the indicator comprises a pulsating light-emitting diode generating a visible light emission when the flash tube properly fires.

18. A flash monitor for detecting an inductive energy of a flash tube assembly in photography, the inductive energy including a true inductive flash tube discharge pulse when the flash tube properly fires, the flash tube assembly including a flash tube, a tube power cable, and an exterior surface surrounding the flash tube and through which the tube power cable traverses, the flash monitor comprising:

a housing member;

an indicator attached to the housing member, the indicator being perceptible to an operator;

means for removably mounting the housing member to be operatively responsive to an inductive energy associated with an excitation of a flash tube, the mounting means securing the housing member to one of the exterior surface of the flash tube assembly and the tube power cable, thereby positioning the detection means sufficiently near one of the flash tube and the tube power cable for reliable detection of the inductive energy;

detection means having no electrically conductive connection to the flash tube for providing a detection signal by responding to the inductive energy of the flash tube;

verifying means for receiving the detection signal and providing a verification signal when the detection signal indicates that the inductive energy detected by the detection means includes a true inductive flash tube discharge pulse;

activating means responsive to the verification signal for activating the indicator for a predetermined time period; and a source of power for powering the indicator, the verifying means, and the activating means;

wherein the detection means, verifying means, activating means, and source of power are contained within the housing member.

19. The flash monitor of claim 18 wherein the detection means integrates the inductive energy providing the detection signal.

20. The flash monitor of claim 18 wherein the detection means comprises an inductor and a detector capacitor connected in parallel.

21. The flash monitor of claim 18 wherein the detection means comprises a magnetostrictive sensor and a current transformer.

22. The flash monitor of claim 18 wherein the verification means comprises:

a first transistor, including a first collector, a first base, and a first emitter, the detection signal being applied across the first base and the first emitter;

a biasing resistor electrically connecting the first collector and the first base for increasing a sensitivity of the verification means;

a second transistor, including a second collector, a second base, and a second emitter, the second base being electrically connected to the first collector, the second collector being electrically connected to the source of power, the verification signal being provided by the second emitter; and a load resistor electrically connecting the second collector and the second base for limiting an amount of power consumed from the source of power by the verification means.

23. The flash monitor of claim 18 wherein the activation means comprises:

a charging capacitor receiving the verification voltage and developing a charging capacitor voltage in response thereto;

an enhancement-mode MOSFET receiving the charging capacitor voltage, the MOSFET beginning to conduct and thereby activating the indicator when the charging capacitor voltage exceeds a threshold conduction level of the MOSFET; and a discharge diode electrically connected across the charging capacitor for discharging the capacitor after the MOSFET has been conducting for the predetermined time period.

24. A flash monitor alarm to be mounted in a vehicle for detecting short rise time optical pulses that are indicative of operation of halogen or gas discharge flashers of an emergency vehicle comprising:

a housing member;

an indicator attached to the housing member, the indicator being perceptible to an operator;

means for removably mounting the housing member to be operatively responsive to the short rise time optical pulses associated with the flashers of an emergency vehicle;

detection means having no electrically conductive connection to the flashers for providing a detection signal by responding to the short rise time optical pulses of the flashers;

verifying means for receiving the detection signal and providing a verification signal when the detection signal indicates that the optical pulses detected by the detection means includes a true short rise time optical pulse; and activating means responsive to the verification signal for activating the indicator for a predetermined time period;

wherein the detection means, verifying means, and activating means are contained within the housing member.

25. The flash monitor alarm of claim 24 wherein the mounting means secures the housing member to the visor of the vehicle, thereby positioning the detection means to detect short rise time optical energy pulses within line of sight.

26. The flash monitor alarm of claim 24 further comprising a source of power contained within the housing member for powering the indicator, the verifying means, and the activating means.

27. The flash monitor alarm of claim 24 wherein the indicator generates an audible sound when short rise time optical pulses are detected and verified.

28. The flash monitor alarm of claim 27 wherein the indicator generates a visible light emission when short rise time optical pulses are detected and verified.

29. The flash monitor alarm of claim 24 wherein the indicator comprises a loudspeaker generating an audible sound when short rise time optical pulses are detected and verified.

30. The flash monitor alarm of claim 29 wherein the loudspeaker is a piezoelectric loudspeaker.

31. The flash monitor alarm of claim 24 wherein the indicator comprises a pulsating light-emitting diode generating a visible light emission when short rise time optical pulses are detected and verified.

32. The flash monitor alarm of claim 24 wherein the indicator comprises a circuit that outputs radio frequency pulses when short rise time optical pulses are detected and verified.

33. The flash monitor alarm of claim 24 wherein the detection means comprises an inductor and a photodiode connected in parallel.

34. The detector means of claim 33, wherein the photodiode is a multidiode array.

35. The detector means of claim 34 wherein the multidiode array has baffles to provide a signal indicating the direction from which the short rise time optical pulses are coming.

36. A flash monitor for detecting an inductive energy of a flash tube assembly in photography, the inductive energy including a true inductive flash tube discharge pulse when the flash tube properly fires, the flash tube assembly including a flash tube, a tube power cable, and an exterior surface surrounding the flash tube and through which the tube power cable traverses, the flash monitor comprising:

a housing member;

an indicator attached to the housing member, the indicator being perceptible to an operator;

detection means for providing a detection signal by responding to the inductive energy of the flash tube, the detection means selected from the group consisting of an inductor and a detector capacitor connected in parallel, and a magnetostrictive sensor with a current transformer;

means for removably mounting the housing member to be operatively responsive to the inductive energy associated with the firing of the flash tube, the mounting means securing the housing member to one of the exterior surface of the flash tube assembly and the tube power cable, thereby positioning the detection means sufficiently near one of the flash tube and the tube power cable for reliable detection of the inductive energy;

verifying means for receiving the detection signal and providing a verification signal when the detection signal indicates that the inductive energy detected by the detection means includes a true inductive flash tube discharge pulse;

activating means responsive to the verification signal for activating the indicator for a predetermined time period; and a source of power for powering the indicator, the verifying means, and the activating means;

wherein the detection means, verifying means, activating means, and source of power are contained within the housing member.

37. The flash monitor of claim 36 wherein the activation means comprises:

a charging capacitor receiving the verification voltage and developing a charging capacitor voltage in response thereto;

an enhancement-mode MOSFET receiving the charging capacitor voltage, the MOSFET beginning to conduct and thereby activating the indicator when the charging capacitor voltage exceeds a threshold conduction level of the MOSFET; and a discharge diode electrically connected across the charging capacitor for discharging the capacitor after the MOSFET has been conducting for the predetermined time period.

38. The flash monitor of claim 36 wherein the verification means comprises:
- a first transistor, including a first collector, a first base, and a first emitter, the detection signal being applied across the first base and the first emitter;
- a biasing resistor electrically connecting the first collector and the first base for increasing a sensitivity of the verification means;
- a second transistor, including a second collector, a second base, and a second emitter, the second base being electrically connected to the first collector, the second collector being electrically connected to the source of power, the verification signal being provided by the second emitter; and
- a load resistor electrically connecting the second collector and the second base for limiting an amount of power consumed from the source of power by the verification means.

39. A flash monitor alarm to be mounted in a vehicle for detecting short rise time optical pulses that are indicative of the operation of halogen or gas discharge flashers of an emergency vehicle comprising:

- a housing member;
- an indicator attached to the housing member, the indicator being perceptible to an operator;
- means for removably mounting the housing member to be operatively responsive to the optical pulses associated with the flashers of an emergency vehicle;
- detection means responsive to the short rise time optical pulses of the flashers for providing a detection signal, the detection means comprising an inductor and a photodiode connected in parallel;
- verifying means for receiving the detection signal and providing a verification signal when the detection signal indicates that the optical pulses detected by the detection means includes a true short rise time optical pulse; and
- activating means responsive to the verification signal for activating the indicator for a predetermined time period;
- wherein the detection means, verifying means, and activating means are contained within the housing member.

40. The detector means of claim 39, wherein the photodiode is a multidiode array.

41. The detector means of claim 40, wherein the multidiode array has baffles to provide a signal indicating a direction from which the short rise time optical pulses are coming.

* * * * *